United States Patent Office 2,978,057
Patented Apr. 4, 1961

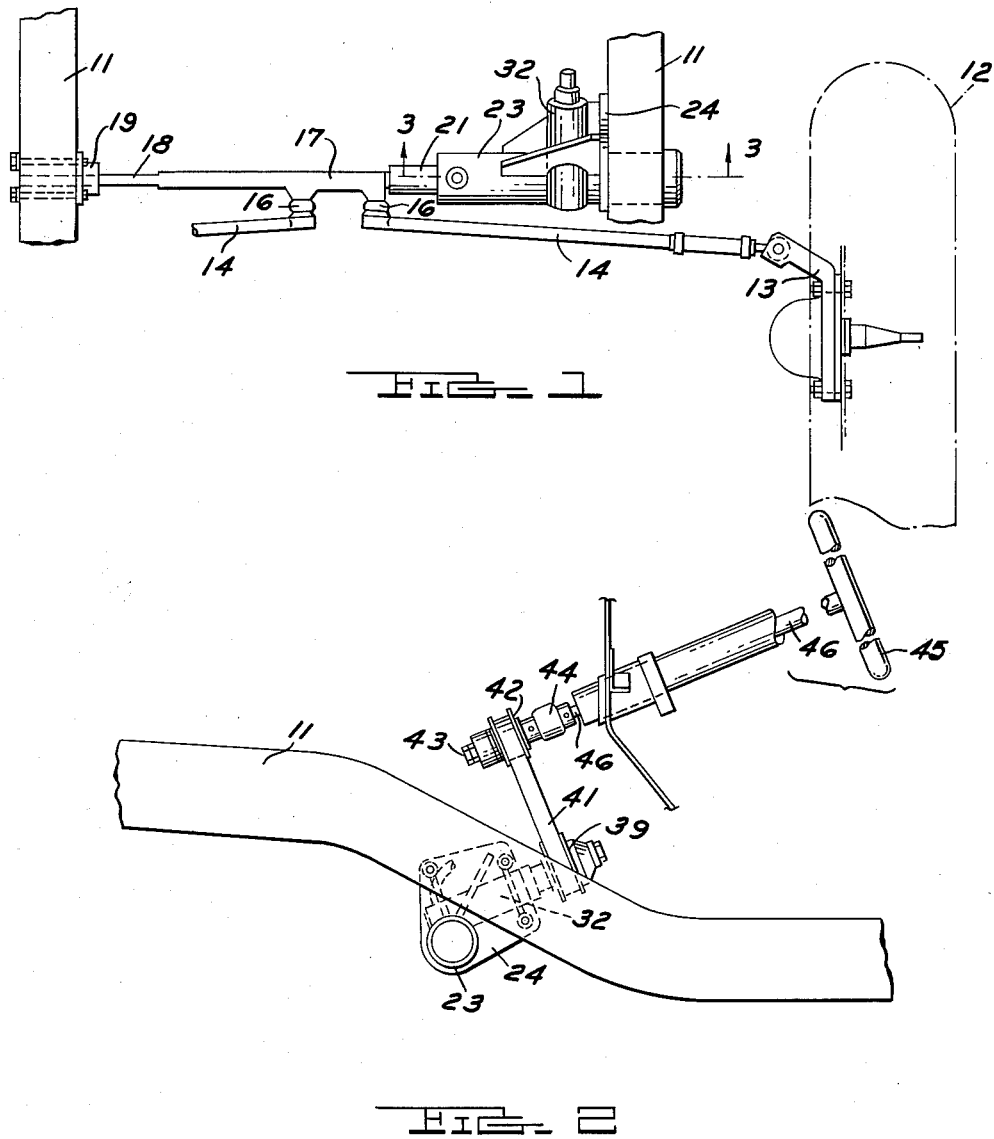

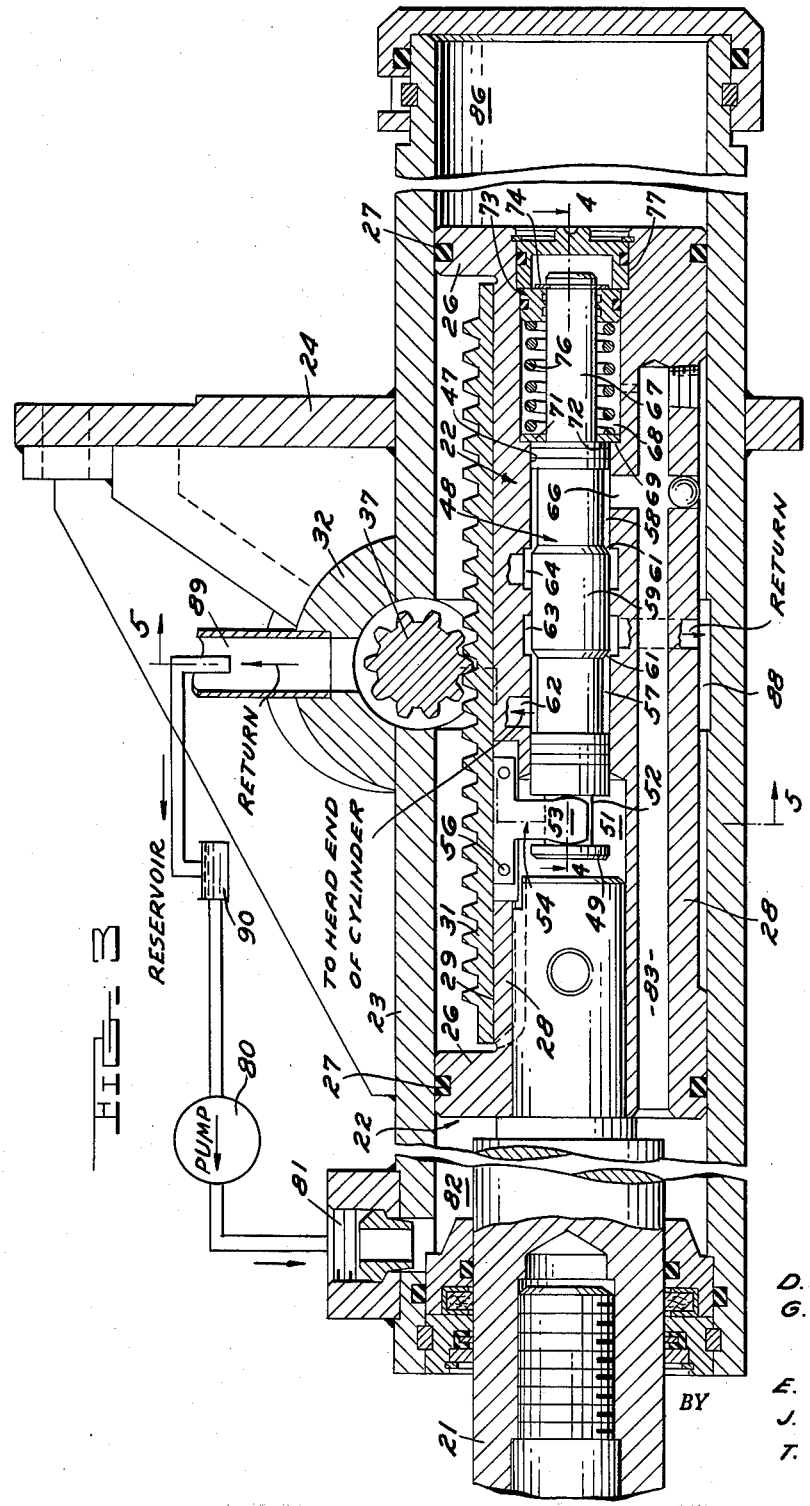

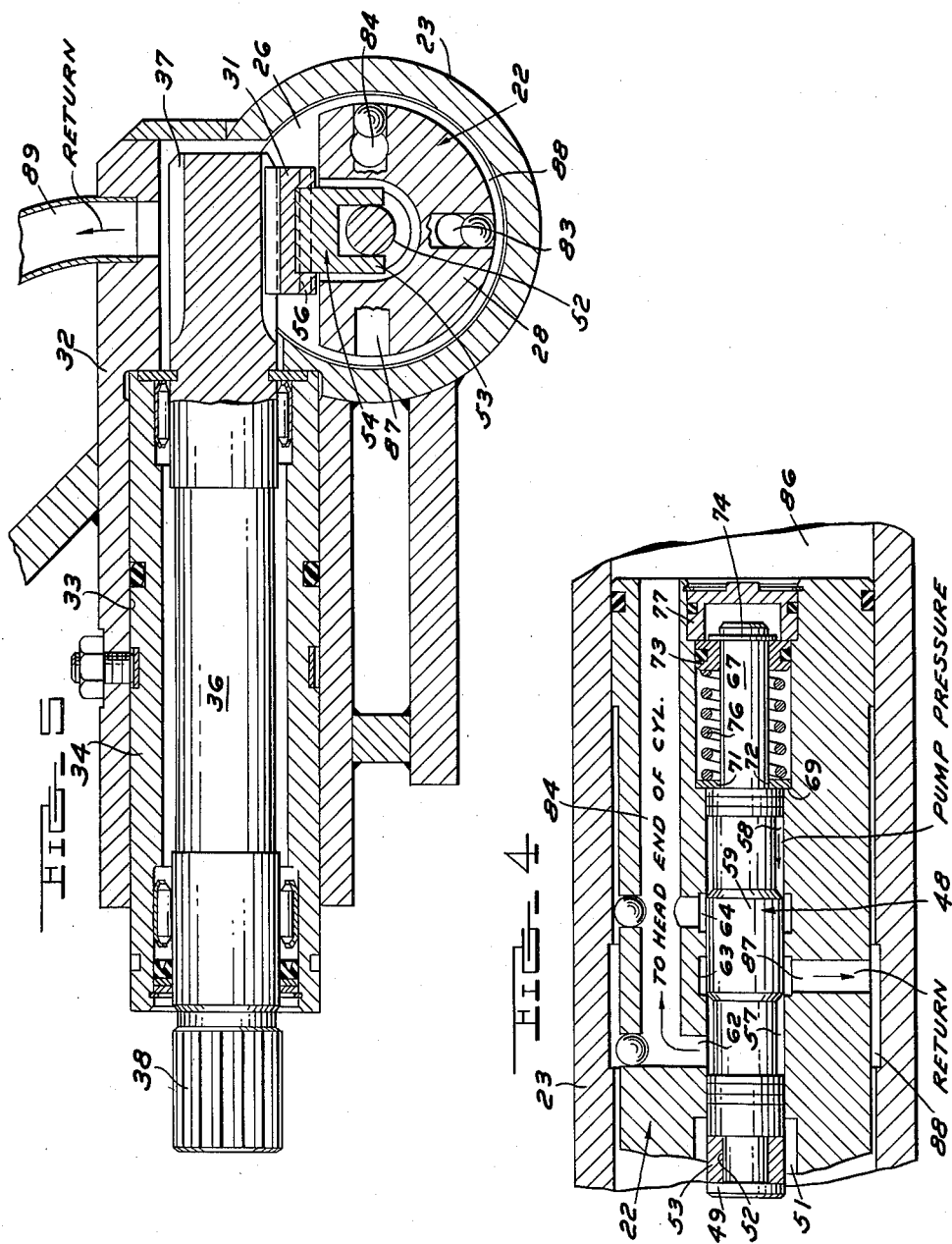

2,978,057

POWER STEERING DEVICE

David W. Barton, Birmingham, and Glenn A. Ulrich, Garden City, Mich., assignors to Ford Motor Company, Dearborn, Mich., a corporation of Delaware Filed Sept. 16, 1958, Ser. No. 761,384

6 Claims. (Cl. 180—79.2)

This invention relates generally to power steering mechanisms for motor vehicles and has particular reference to a hydraulic power steering mechanism of the rack and pinion type.

In an embodiment of the present invention a power steering cylinder is mounted upon the vehicle frame at one side thereof and extends transversely with a guided extension of the piston rod being connected to the steering linkage to steer the vehicle road wheels. The piston carries a toothed rack within the cylinder and the latter is engaged by a pinion on a pinion shaft journaled in an extension of the cylinder housing projecting at right angles therefrom. The invention differs from that disclosed in the copending application of David W. Barton and Glenn A. Ulrich, entitled Power Steering Mechanism, Serial No. 761,385, and having a common assignee with the present application, in that the hydraulic valve means and valve actuating means are contained within the cylinder and associated with the piston therefor. A spring centered valve is reciprocally mounted in the piston and is actuated by movement of the toothed rack axially of the piston under steering loads. A compact relatively inexpensive power steering device is provided.

Other objects and advantages of this invention will be made more apparent as this description proceeds, particularly when considered in connection with the accompanying drawings, in which:

Figure 1 is a semi-diagrammatic plan view of a portion of a motor vehicle chassis incorporating the present invention;

Figure 2 is a side elevational view of a portion of the structure shown in Figure 1;

Figure 3 is an enlarged cross section on the line 3—3 of Figure 1;

Figure 4 is a cross section on the line 4—4 of Figure 3;

Figure 5 is a cross section on the line 5—5 of Figure 3.

Referring now to the drawings, the reference character 11 indicates the longitudinally extending side frame rails of a motor vehicle frame. A pair of steerable front road wheels 12 are conventionally suspended upon the vehicle frame, and are steered by means of conventional steering arms 13 and transversely extending tie rods 14. The tie rods 14 are connected by ball joints 16 to a transversely extending cross rod 17.

At one end the cross rod 17 is formed with a flattened portion 18 extending through a guide bracket 19 depending from the adjacent side frame rail 11. This construction guides one end of the cross rod 17 and freely permits reciprocation thereof in a transverse direction, while at the same time preventing rotation of the cross rod 17 under the loads imposed upon the cross rod by the tie rods 14.

The opposite end of the cross rod 17 is threaded and received within the internally threaded end of a piston rod 21. As best seen in Figure 3, the piston rod 21 is secured to a spool shaped piston 22 reciprocable within a power cylinder 23. The power cylinder 23 extends transversely of the vehicle with the outboard end thereof located beneath the side frame rail 11. A vertical mounting bracket 24 is provided on the cylinder 23, and is adapted to be secured to the inboard side of the side frame rail 11 to fixedly mount the power cylinder in position.

The piston 22 is formed with end flanges 26 provided with sealing rings 27 and with a reduced central portion 28 interconnecting the ends 26. The central portion 28 of the piston is cut away along one side to form a flat guide portion 29 slidably receiving a toothed rack 31 having a limited axial sliding movement relative to the piston.

As seen in Figures 1, 2 and 5, a cylindrical extension 32 projects at right angles from approximately the central portion of the cylinder 23 and extends in an inclined direction generally rearwardly and upwardly from the cylinder. The extension 32 is formed with a bore 33 receiving a sleeve 34 which in turn rotatably receives a pinion shaft 36 having a small diameter pinion 37 formed at one end thereof and meshing with the toothed rack 31 carried by the piston 22. The opposite end 38 of the pinion shaft is splined to receive a toothed sprocket 39 (Figure 2) engaging teeth formed on the internal surface of a flexible driving belt 41. The belt may be formed of steel reinforced rubber to provide strength yet flexibility. The belt also meshes with a toothed sprocket 42 mounted on a shaft 43 connected by means of a flexible coupling 44 to the lower end of a steering post 46, the upper end of which carries a conventional steering wheel 45 for manual operation by the vehicle driver.

It will be noted that the axis of the steering post 46 extends generally parallel to the axis of the pinion shaft 36 journalled within the housing extension 32, but that the steering post is offset radially both upwardly and laterally outwardly from the housing extension. This enables the steering post to be located in the proper position and at the proper angle for the convenience of the vehicle operator yet enables the power steering mechanism to be most effectively located for proper control of the steering linkage, and in a position providing accessibility without interferring with other vehicle components.

With reference now to Figure 3, the right hand end of piston 22 is formed with a valve bore 47 receiving a valve spool 48 which is reciprocably mounted therein. The left hand end 49 of the valve spool projects into an opening 51 formed in the piston 22, and is formed with an annular groove 52 on its periphery. The groove 52 receives the bifurcated end portions 53 of an actuating fork 54 secured to the slidable rack 31 by means of pins 56. It will be seen that reciprocation of the toothed rack 31 relative to the piston 22 results in simultaneous reciprocation of the valve spool 48 within the valve bore 47 of the piston.

The valve spool 48 is formed with axially spaced annular peripheral grooves 57 and 58, and with an intermediate land 59 having chamfered end portions 61 connecting with the grooves 57 and 58 respectively. The valve spool cooperates with ports 62, 63, 64 and 66 formed in the piston 22 adjacent the valve bore 47, as will be described more in detail hereinafter.

The right hand reduced end portion 67 of the valve spool 48 is received within an enlarged cylindrical chamber 68 at the end of the valve bore 47. A shoulder 69 is formed at the end of the chamber 68 and forms a stop for a washer 71 sleeved on the reduced end portion 67 of the valve spool. The washer 71 also engages the shoulder 72 formed between the valve spool and the reduced end portion thereof.

A collar 73 is mounted on the opposite end of the reduced end portion 67 of the valve spool, and is held thereon by means of a retaining ring 74. A coil spring 76 acts in compression between the washer 71 and the collar 73, and axial movement of the collar is limited by engagement with an end cap 77.

The slidable rack 31 and the valve spool 48 carried thereby are shown in Figure 3 in neutral position during straight ahead driving. When the steering wheel is turned the pinion 37 operated thereby engages the rack 31 and, due to the resistance to steering afforded by the road wheels, tends to move the rack axially relative to the piston 22. This relative movement is opposed by the coil spring 76 at the end of the valve spool. During a turn in which the rack 31 and the interconnected valve spool 48 are moved to the left relative to the piston the washer 71 remains seated on the piston shoulder 69 while the collar 73 carried by the valve spool moves to the left, compressing the coil spring 76. During a turn in the opposite direction the rack 31 and interconnected valve spool 48 move to the right relative to the piston 22, and movement of the collar 73 is restrained by engagement with the cap 77 carried by the piston while the washer 71 is carried away from the piston shoulder 69, compressing the coil spring 76. The resulting relative movement between the valve spool 48 and the piston 22 during steering movements in opposite directions is effective to direct fluid pressure to the appropriate end of the cylinder 23 to provide a power assist to the manual steering effort.

Although containing some variations, the valve mechanism of this invention is of the general type described in the copending application of Warren A. Van Wicklin, Jr., entitled Power Steering Mechanism, Serial No. 761,383, now abandoned, and having a common assignee with this application.

The cylinder 23 is provided with a port 81 adapted to be connected to a conventional fluid pressure pump 80 to supply fluid under pressure to the annular chamber 82 in the piston rod end of the cylinder. This fluid pressure acts upon the effective area of the piston rod end of the piston. The fluid pressure supplied to the chamber 82 from the pump also communicates with the piston port 66 through an axially extending passageway 83 formed in the lower portion of the piston. As best seen in Figure 4, the piston ports 62 and 64 both communicate with an axially extending passageway 84 formed in one side of the piston 22. The passageway 84 opens into the chamber 86 in the head end of the cylinder 23.

The intermediate piston port 63 communicates through a radial passageway 87 with an annular chamber 88 formed between the cylinder 23 and the reduced central portion 28 of the piston 22. The annular chamber 88 communicates with a return passageway 89 (Figures 3 and 5) which in turn communicates with a fluid reservoir 90 supplying fluid for the pump. It will thus be seen that the chamber between the end flanges 26 of the piston forms a low pressure return chamber.

The operation of the valve mechanism will best be seen from an examination of Figures 3 and 4. During the neutral or straight ahead driving position shown in the drawings it will be seen that the valve mechanism is completely open and that the annular grooves 57 and 58 in the valve spool 48 interconnect piston ports 62, 63, 64 and 66 so that free fluid communication exists between the pump, both ends of the cylinder and the return.

When the valve spool 48 is moved to the right relative to the piston 22 during a steering movement in one direction, it will be seen that the piston port 64 is closed by the land 59 of the valve spool. Fluid pressure from the pump then is applied only to the chamber 82 in the piston rod end of the cylinder, while the chamber 86 in the head end of the cylinder is connected through 84, 62, 57, 63, 87, and 88 to the return conduit 89. The piston 22 is then moved to the right under the action of the fluid pressure from the pump acting upon the differential area of the piston at its piston rod end.

When the valve spool 48 is moved to the left relative to the piston 22, the land 59 closes the return port 63 in the piston, and it will be seen that pump pressure is applied not only to the chamber 82 in the piston rod end of the cylinder, but also to the chamber 86 in the head end of the cylinder. The path of fluid flow to the chamber 86 is through 81, 82, 83, 66, 58, 64 and 84. Since the effective area of the head end of the piston is twice that of the effective area of the piston rod end of the piston, the piston is moved to the left with a force equal to that moving the piston to the right during steering in the opposite direction.

It will be understood that the invention is not to be limited to the exact construction shown and described, but that various changes and modifications may be made without departing from the spirit and scope of the invention, as defined in the appended claims.

What is claimed is:

1. Power steering mechanism for a motor vehicle having a frame, a manually operable steering wheel and a steerable road wheel, comprising relatively reciprocable cylinder and piston members, means connecting one of said members to said vehicle frame, means connecting the other of said members to said steerable road wheel, a source of fluid pressure, a toothed rack mounted upon one of said members for limited sliding movement relative thereto, a valve mounted upon said one member for limited sliding movement relative thereto and controlling the flow of fluid from said fluid pressure source to said cylinder member, said valve being located in radial alignment with said toothed rack and means extending radially from said rack to said valve for operatively connecting said valve to said rack, said valve to be actuated thereby, spring means opposing movement of said rack relative to said last mentioned one member, and a driving gear element operatively connected to said steering wheel and meshing with said rack.

2. Power steering mechanism for a motor vehicle having a frame, a manually operable steering wheel and a steerable road wheel, comprising a hydraulic power cylinder connected to said frame, a piston reciprocable within said cylinder and operatively connected to said road wheel to steer the latter, a source of fluid pressure, said piston having an axially extending bore therein, a valve slidable in said bore, spring means centering said valve in a predetermined position and resisting movement of said valve in either direction from said position, a toothed rack mounted upon said piston for sliding movement relative thereto in an axial direction, said toothed rack axially overlapping said slidable valve, a connection between said rack and said valve, said connection including means extending radially from said rack to said valve and a driving gear member connected to said manually operable steering wheel and meshing with said rack.

3. The structure defined by claim 2 which is further characterized in that said piston has axially extending passageways therein establishing communication between said valve and the opposite ends of said cylinder, means connecting said fluid pressure source to the piston rod end of said cylinder, said piston having a port therein establishing communication between said valve and said axial groove in said piston, and a return port in said cylinder wall communicating with said piston groove in all positions of said piston.

4. Power steering mechanism for a motor vehicle having a frame, a manually operable steering wheel and a steerable road wheel, comprising a hydraulic power cylinder connected to said frame, a piston reciprocable within said cylinder and operatively connected to said road wheel to steer the latter, a source of fluid pressure, said piston having axially spaced piston heads in sealing engagement with said cylinder and an axially extending bore between said heads, a valve slidable in said bore, a toothed rack mounted upon said piston between said piston heads and axially slidable relative thereto, said rack being located radially outwardly of said slidable valve, a connection extending radially inwardly from said rack to said valve, and a driving gear member connected to said manually operable steering wheel and meshing with said rack.

5. Power steering mechanism for a motor vehicle having a frame, a manually operable steering wheel and a steerable road wheel, comprising, a hydraulic power cylinder connected to said frame, a piston reciprocable within said cylinder and operatively connected to said road wheel to steer the latter, a source of fluid pressure, said piston having an axially extending bore therein, a valve slidable in said bore, said piston having an axially extending groove between the ends thereof, said groove having a radial depth providing a piston wall between said groove and said valve bore, a toothed rack in said piston groove slidable axially on said piston wall, an opening in said piston wall between said groove and said valve bore, means extending through said opening interconnecting said rack and said valve for simultaneous axial sliding movement relative to said piston, and a driving gear member connected to said manually operable steering wheel and meshing with said rack.

6. Power steering mechanism for a motor vehicle having a frame, a manually operable steering wheel and a steerable road wheel, comprising, a hydraulic power cylinder connected to said frame, a piston reciprocable within said cylinder and operatively connected to said road wheel to steer the latter, a source of fluid pressure, said piston having an axially extending valve bore positioned therein located generally on the axis of said piston, a valve slidable in said bore, spring means centering said valve in a predetermined position and resisting movement of said valve in either direction from said position, said piston having an axially extending rack groove at one side thereof, a toothed rack received in said rack groove and mounted upon said piston for sliding movement relative thereto in an axial direction, said toothed rack axially overlapping said slidable valve, said piston having a radially extending opening interconnecting said valve bore and said rack groove, an arm extending through said radially extending opening and interconnecting said rack and said valve for simultaneous movement, and a driving gear connected to said manually operable steering wheel and meshing with said rack.

References Cited in the file of this patent

UNITED STATES PATENTS

| 2,735,502 | Muller | Feb. 21, 1956 |
| 2,755,779 | Muller | July 24, 1956 |
| 2,830,461 | Sheppard | Apr. 15, 1958 |
| 2,865,339 | Bishop | Dec. 23, 1958 |
| 2,867,284 | Hruska | Jan. 6, 1959 |
| 2,869,664 | Utter | Jan. 20, 1959 |

FOREIGN PATENTS

| 735,641 | Great Britain | Aug. 24, 1955 |